(12) United States Patent
Colombot

(10) Patent No.: US 9,155,429 B2
(45) Date of Patent: Oct. 13, 2015

(54) COMPACT DRY TOILET INSTALLATION

(75) Inventor: Pierre Colombot, Saint-Ferreol Trente Pas (FR)

(73) Assignee: ECOSPHERE TECHNOLOGIES, Saint-Ferreol Trente Pas (FR)

( * ) Notice: Subject to any disclaimer, the term of this patent is extended or adjusted under 35 U.S.C. 154(b) by 221 days.

(21) Appl. No.: 14/007,901

(22) PCT Filed: Mar. 14, 2012

(86) PCT No.: PCT/FR2012/050529
§ 371 (c)(1),
(2), (4) Date: Nov. 16, 2013

(87) PCT Pub. No.: WO2012/131210
PCT Pub. Date: Oct. 4, 2012

(65) Prior Publication Data
US 2014/0075664 A1 Mar. 20, 2014

(30) Foreign Application Priority Data
Mar. 31, 2011 (FR) ...................... 11 52679

(51) Int. Cl.
*A47K 11/04* (2006.01)
*A47K 11/02* (2006.01)

(52) U.S. Cl.
CPC ...................... *A47K 11/02* (2013.01)

(58) Field of Classification Search
CPC .............................. A47K 11/02; A47K 11/023
USPC ............................................ 4/449, 479, 483
See application file for complete search history.

(56) References Cited

U.S. PATENT DOCUMENTS

| 6,081,940 | A | * | 7/2000 | Nien | 4/449 |
| 2002/0144339 | A1 | | 10/2002 | Colombot | |
| 2005/0246829 | A1 | * | 11/2005 | La Trobe | 4/449 |
| 2007/0199140 | A1 | | 8/2007 | Lee | |
| 2015/0067956 | A1 | * | 3/2015 | Morin | 4/479 |

FOREIGN PATENT DOCUMENTS

| JP | 2007111146 A | 5/2007 |
| WO | 2006004333 A1 | 1/2006 |

OTHER PUBLICATIONS

French Search Report dated Nov. 28, 2011, corresponding to French Patent Application No. FR 1152679.
International Search Report dated Jun. 12, 2012, corresponding to PCT/FR2012/050529.

* cited by examiner

*Primary Examiner* — Huyen Le
(74) *Attorney, Agent, or Firm* — Ladas & Parry LLP

(57) ABSTRACT

The invention relates to a toilet installing having:
a toilet seat (2) in the form of a hollow body in which there is formed an opening (3) for evacuating liquid effluent (4) and solid waste under gravity,
a conveyor belt (15) mounted in an inclined manner delimiting between a bottom part and a top part a surface (14) for receiving the liquid effluent and solid waste, in order to separate the liquid effluent and solid waste under gravity, a part of the conveyor belt, starting from the bottom part thereof, being mounted inside the toilet seat, the other part protruding from the rear face of the seat,
a device (25) for recovering the liquid effluent (4) having a reception tank mounted inside the toilet seat.

12 Claims, 6 Drawing Sheets

COMPACT DRY TOILET INSTALLATION

This application is a 371 of PCT/FR2012/050529, filed on Mar. 14, 2012, which claims priority to French Patent Application No. 11 52679, filed Mar. 31, 2011.

The present invention concerns the general technical field of systems for sanitizing, evacuating and transforming human faecal matter and urine.

The subject of the invention more particularly concerns the category of dry toilets ensuring the separation of urine and solid waste for treatment thereof by drying or composting.

In the state of the art numerous solutions have been proposed for dry toilet installations in particular by composting. Patent FR 2 442 308 for example describes a device comprising a toilet seat provided with a gravity evacuation opening which passes through the floor and leads to means for collecting liquid effluent and solid waste such as faecal matter and toilet paper. The collecting means are formed of an endless sloped band that is part of a conveyor belt ensuring the separation under gravity of liquid effluent and solid waste. This conveyor belt is mounted in a chamber located at a lower level than the room in which the toilet seat is installed. This chamber is fitted out with a series of superimposed tanks collecting the liquid effluent flowing from the lower part of the conveyor belt. The movement of this conveyor belt is controlled to ensure the transfer of solid waste towards a treatment station arranged in adjacent premises.

Aside from the efficacy of this installation, one main drawback of this installation concerns the size thereof having regard to the various technical means required for treating urine and solid waste. In practice it proves to be difficult and even impossible to install such dry toilets in collective dwellings and in particular in flats of an apartment block. In addition, such dry toilets do not provide absolute safety in particular with regard to young children, thereby preventing the installation thereof in a family home.

Similarly, document WO 2006/004333 describes a dry toilet installation arranged inside a building provided with a chamber underneath the toilet seat and which comprises technical means for treating urine and faecal matter. Said installation necessitates much space requiring a superimposed two-level arrangement. In addition, said installation does not provide absolute safety in particular for young children.

The present invention sets out to overcome the drawbacks of the prior art by proposing a novel dry toilet installation which is compact, in particular not necessitating the providing of a chamber underneath the toilet whilst being fully safe for all users and notably for young children.

To reach this objective the dry toilet installation conforming to the invention comprises:
- a toilet seat in the form of a hollow body which, opposite a lower bearing surface on the ground, has an upper surface in which there is arranged an opening for evacuation under gravity of liquid effluent and solid waste;
- a conveyor belt mounted at an angle delimiting, between a bottom part and a top part, a surface for receiving liquid effluent and waste solid, to ensure the separating under gravity of liquid effluent and solid waste;
- a device for collecting liquid effluent derived from the conveyor belt;
- a transfer system ensuring the forward movement of the conveyor belt and hence the conveying of solid waste from a receiving area directly below the evacuation opening, towards a storage area.

According to the invention:
- part of the conveyor belt, starting from its bottom part, is mounted inside the toilet seat so that, directly below the evacuation opening, the distance between the conveyor belt and said opening is between 15 and 35 cm, the conveyor belt projecting from the rear face of the seat through a passageway made in said rear face of the seat;
- the gravity evacuation opening is skirted by a down pipe extending as far as the receiving surface, being positioned so that its free end is not parallel to the receiving surface, the anterior part of the free end of the down pipe being mounted to lie flush with the receiving surface so as to act as stop abutment for solid waste, the posterior part of the free end of the down pipe lying away from the receiving surface to allow solid waste to pass, the anterior and posterior parts taking into account the front and rear faces of the seat;
- the device for collecting liquid effluent comprises a receiving tank mounted inside the toilet seat directly below the bottom part of the conveyor belt.

A further subject of the invention is an installation comprising in combination one and/or the other of the following additional characteristics:
- the gravity evacuation opening is arranged in the upper surface of the seat whose front face is of rounded shape;
- the gravity evacuation opening has a through cross-section of which at least part of its projection extends outside the conveyor belt, and in that the down pipe comprises a lower end delimiting an opening whose projection extends inside the conveyor belt, the lower end of the collecting pipe being connected via a flared connecting wall to the upper end of the collecting pipe skirting the evacuation opening;
- the toilet seat is in the form of a chest of substantially parallelepiped shape;
- the down pipe has an inner surface of dark colour and of speckled appearance;
- the gravity evacuation opening has an oblong through cross-section so that its projection lies inside the conveyor belt;
- the receiving tank for liquid effluent comprises a trap part;
- the receiving tank has a run-off surface as far as an evacuation opening, the receiving tank being equipped with a scraper system to scrape the run-off surface or to spray a cleaning liquid onto the run-off surface to remove solid deposits which may hamper said run-off surface;
- the storage area comprises a composting medium formed in particular of solid waste brought by the conveyor belt and of earthworms of a variety adapted to the conversion of waste to compost, and optionally a humidifying system intended to maintain the composting medium moist other than through the addition of urine;
- a transfer device to transfer solid waste which has accumulated in the storage area directly below the top part of the conveyor belt;
- the functioning of the waste transfer device is synchronized with the travel of the conveyor belt;
- a device for collecting solid waste brought into the storage area comprising a bucket line which can be moved vertically and brought temporarily to station in the storage area during this movement, this movement of the bucket line being synchronized with the travel of the conveyor belt.

Various other characteristics will become apparent from the description given below with reference to the appended drawings which, as non-limiting examples, illustrate embodiments of the subject of the invention.

Figure 1:
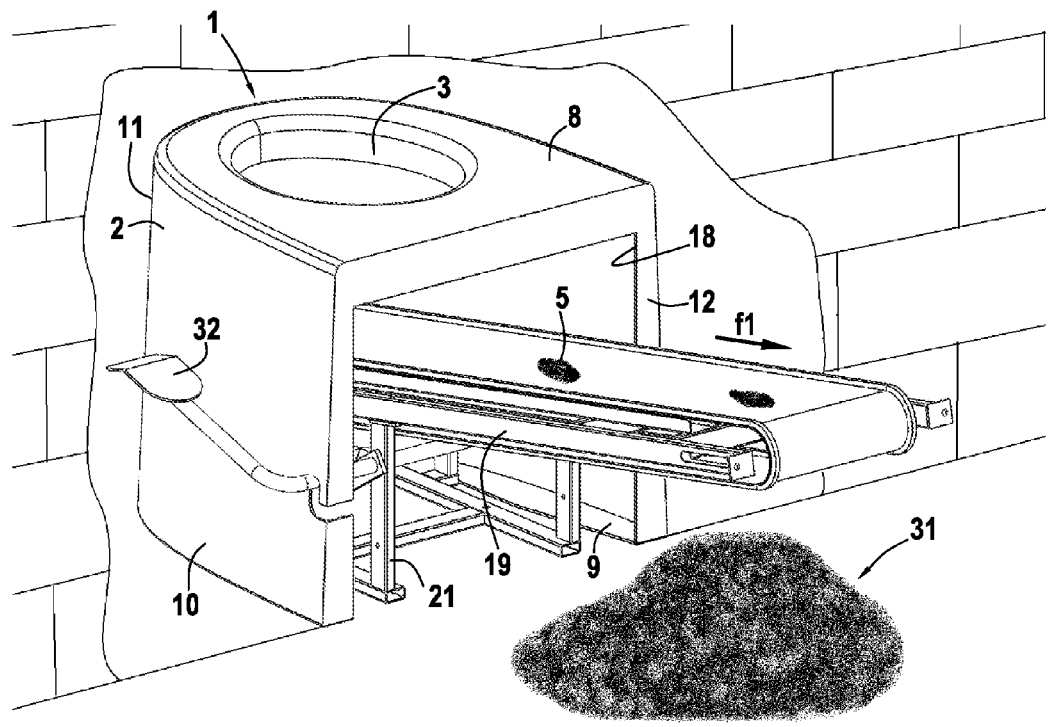
FIG. 1 is a perspective rear view showing a first example of embodiment of a compact dry toilet installation conforming to the invention.
Figure 2:
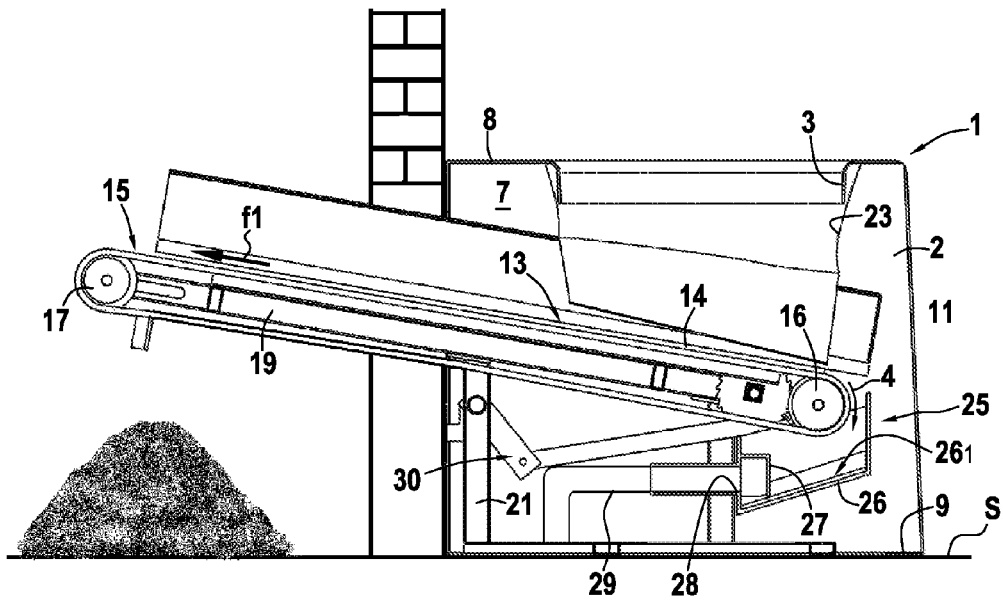
FIG. 2 is an elevation cross-sectional view of a dry toilet installation such as illustrated in FIG. 1.

As can be seen more clearly in FIGS. 1 and 2, the subject of the invention concerns a compact dry toilet installation 1 comprising a toilet seat 2 delimiting a gravity evacuation opening 3 for liquid effluent 4 such as urine and solid waste 5 such as faecal matter, toilet paper or sanitary towels.

The toilet seat 2 is in the form of a hollow body delimiting an inner volume 7. This seat 2 has an upper surface 8 in which the evacuation opening 3 is arranged extending parallel to a lower surface 9 bearing on the ground S.

The upper 8 and lower 9 surfaces are connected together by sidewalls 10, a front face 11 and a rear face 12. In the example illustrated in FIGS. 1 to 3, the front face 11 is rounded whilst in the example illustrated in FIG. 4, the front face 11 is flat. Preferably, the lower bearing surface 9 is limited to a peripheral border extending at right angles from the sidewalls 10 and the front face 11.

Advantageously the seat, 2 between its upper surface 8 and its lower bearing surface 9, has a height of between 45 and 50 cm.

The gravity evacuation opening 3 lies directly above a collection system 13 collecting solid waste 5 and liquid effluent 4, ensuring the separating under gravity of the solid waste 5 and liquid effluent 4. In the illustrated example, the collection and separation system 13 has a sloped surface 14 onto which the gravity evacuation opening 3 opens so as to collect the solid waste 5 and liquid effluent 4. The sloped surface 14 collecting the liquid effluent 4 and solid waste 5 is adapted to ensure the complete separation under gravity of the liquid effluent 4 from the solid waste 5. The receiving surface 14 is sloped at an angle of between values of a few degrees to a few tens of degrees and is preferably between 5 and 30°. The sloped receiving surface 14 is part of a conveyor belt 15 formed from an endless belt having a bottom part and a top part and forming the receiving surface 14. This endless belt is mounted between a first so-called lower roller 16 mounted inside the seat 2, and a second so-called upper roller 17 extending outside the seat 2 passing through the rear face 12 via an opening or passageway 18 arranged in the rear face 12. The two rollers 16, 17 are mounted on supporting spars 19 extending between the bottom and top parts of the conveyor belt 15.

The conveyor belt 15 is supported by a carrier structure 21 bearing upon the ground S and mounted inside the seat 2. The carrier structure 21 is fastened onto the supporting spars 19 of the conveyor belt 15 which therefore extends overhanging the seat 2 and in particular the rear face 12 thereof. Therefore part of the conveyor belt 15, starting from its bottom part delimited by the first roller 16, is mounted inside the seat 2 whilst the top part of the conveyor belt delimited as from the second roller 17, extends outside the seat 2 passing through the rear face 12 of the seat 2. In the example illustrated in the drawings, more than one half of the length of the conveyor belt 15 is mounted inside the seat 2.

According to one characteristic of the invention, the conveyor belt 15 is mounted so that the receiving surface 14 located directly underneath the evacuation opening 3, lies at a distance from this evacuation opening 3 of between 15 and 35 cm and is in the order of 30 cm for example. Therefore the height between the evacuation opening 3 and the receiving surface 14 is relatively limited preventing the accidental fall of a child for example.

According to another characteristic of the invention the gravity evacuation opening 3 extends as far as the receiving surface 14 via a down pipe 23. As can be more specifically seen in FIG. 2, the down pipe 23 extends from the evacuation opening 3 as far as the receiving surface 14, being positioned so that its free end $23_1$ is not parallel to the receiving surface 14. Therefore the anterior part of the free end $23_1$ of the down pipe is mounted so as to lie flush with the receiving surface 14 in order to act as stop abutment for solid waste 5. The posterior part of the free end $23_1$ of the down pipe 23 lies away from the receiving surface 14 to allow solid waste 5 to pass. The anterior and posterior parts of the free end $23_1$ take into account the front and rear 12 faces of the seat 2. According to one advantageous variant of embodiment, the down pipe 23 has an inner surface of dark colour and speckled appearance.

The installation 1 of the invention also comprises a device 25 for collecting liquid effluent flowing from the bottom part of the conveyor belt 15. The device 25 collecting liquid effluent 4 comprises a receiving tank 26 mounted directly under the bottom part of the conveyor belt 15, being mounted inside the toilet seat 2. For example the tank 26 is mounted on the carrier structure 21 so that it is held in a stable position. Optionally, the tank 26 has a trap part 27 to avoid rising odours. This trap part communicates with an evacuation opening 28 equipped with a connector 29 connecting to an evacuation line. Therefore the tank 26 has a run-off surface $26_1$ arranged to lead the liquid effluent towards the evacuation opening 28.

According to another characteristic of the invention, the toilet installation 1 comprises a transfer system 30 ensuring the forward travel of the conveyor belt 15 and hence the conveying of solid waste 5 from a receiving area located directly underneath the evacuation opening 3 towards a storage and/or treatment area 31. This transfer system 30 ensures the movement of the receiving surface 14 in a direction illustrated by the arrow F1 in FIGS. 1 and 2, towards the upper part or top of the conveyor belt 15. The transfer system 30 comprises a control mechanism 32 such as a pedal for example actuated after each use of the toilet. The actuation of the pedal leads to movement of the conveyor belt further to rotation of one of the rollers 16, 17. The rotation of one of the rollers 16, 17 is ensured by a motorised unit or preferably by a mechanical pinion and rod system actuated by the pedal 32.

According to one preferred embodiment the transfer system 30 is adapted to allow the travel of the conveyor belt 15 every 3 to 20 actuations by the pedal 32, over a sufficient distance to transfer the solid waste 5 falling directly under the evacuation opening 3 away from the direct line of this gravity evacuation opening 3 to avoid humidifying the solid waste 5 collected in the area 31. Therefore the solid waste 5 is brought to the top part of the conveyor belt 15 after a few tens or few hundred uses. The conveyor belt 15 therefore ensures the transferring of the solid waste 5 as far as the upper end or top of the conveyor belt 15, so that the solid waste 5 falls under gravity into the storage and/or treatment area 31.

According to one preferred variant of embodiment, the solid waste 5 in the area 31 is fed to a composting medium which in particular comprises earthworms of a variety adapted to the conversion of faecal matter and other waste into compost.

It follows from the foregoing description that the dry toilet installation 1 is compact since it does not require the providing of a chamber below the toilet seat. The toilet installation 1 of the invention can be installed on a single level of a home or dwelling since all the equipment is arranged inside the seat 2 with the exception of part of the conveyor belt 15 which projects from the rear face 12 into a chamber adjacent to or outside the dwelling. In addition said toilet installation 1 eliminates the risk of injury in the event of a fall by very young children, the falling height being no more than 35 cm.

Figure 3:
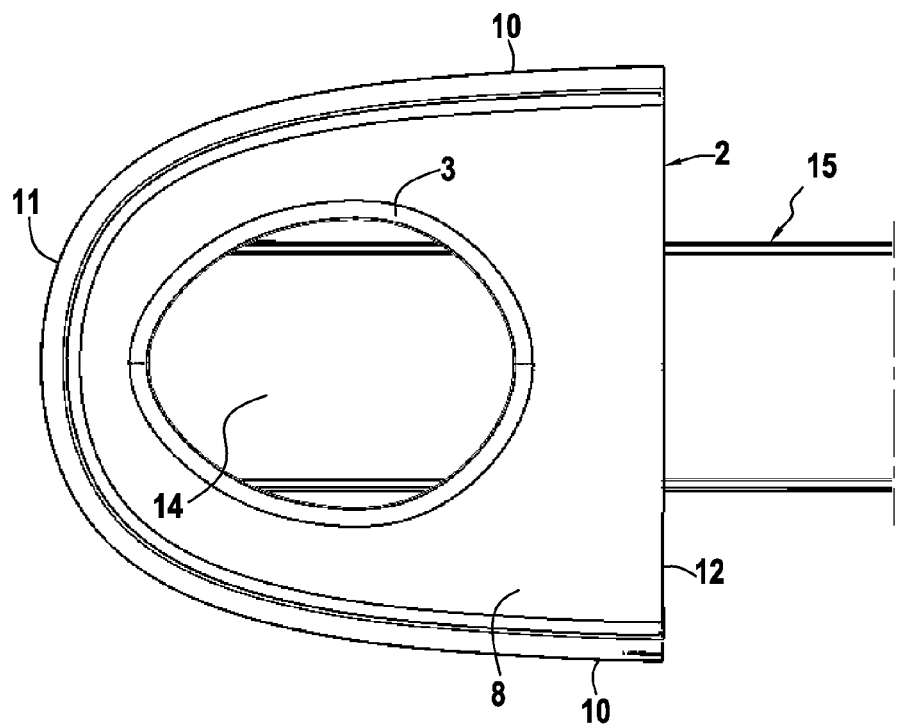
FIG. 3 is an overhead view of the seat of the toilet illustrated in FIGS. 1 and 2.
Figure 4:
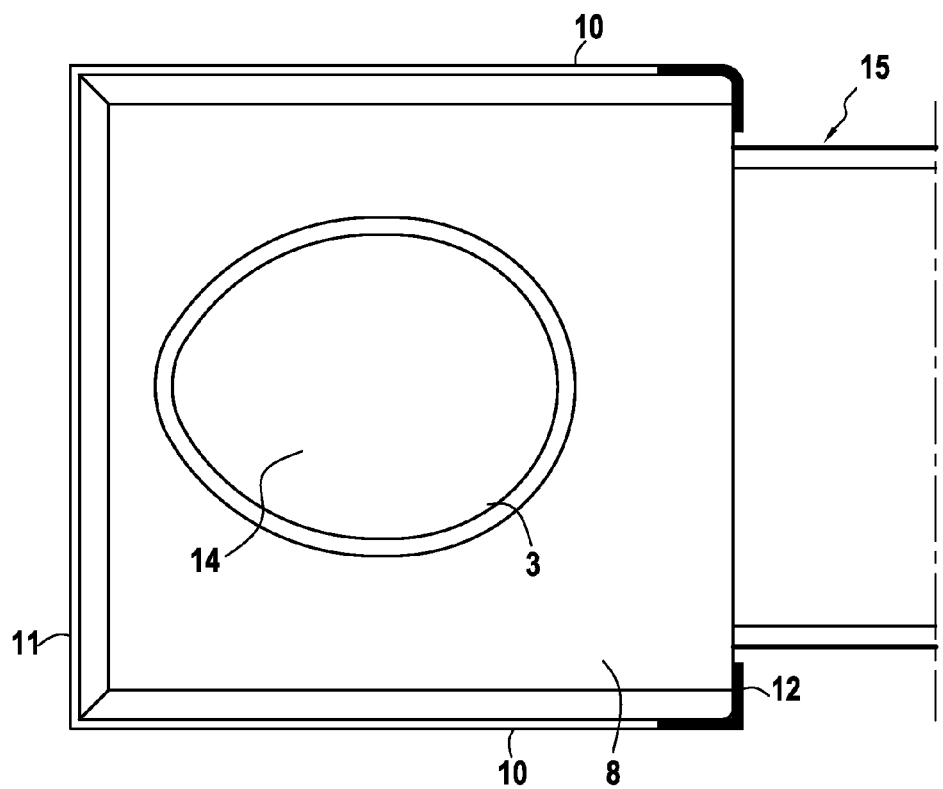
FIG. 4 is an overhead view of another variant of embodiment of a toilet seat conforming to the invention.
Figure 5:
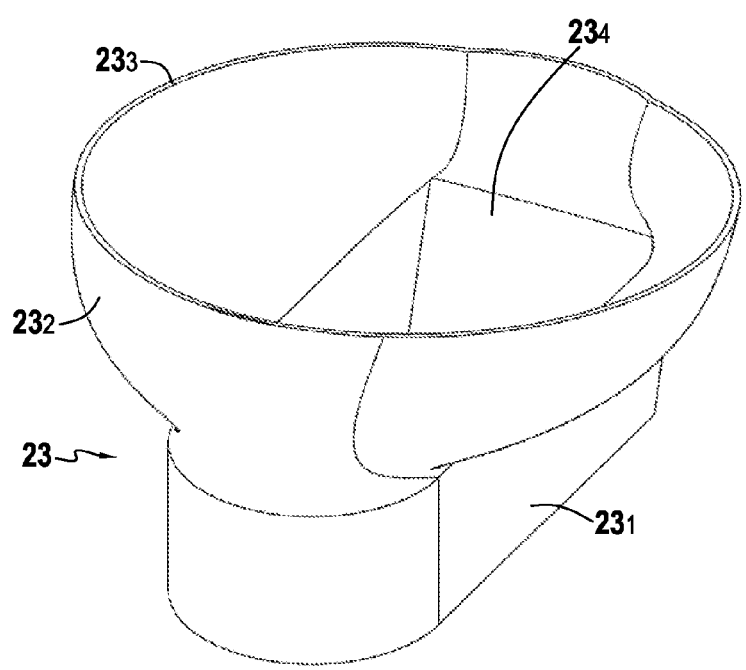
FIG. 5 is a perspective view of an example of embodiment of a down pipe equipping a toilet installation conforming to the invention.

In the example illustrated in FIG. 4, the seat 2 has a flat front face 11 facilitating the installing of a wide conveyor belt 15 i.e. having a surface close to or larger than the size of the projection of the evacuation opening 3. According to this variant of embodiment the seat 2 is made in the form of a chest of parallelepiped shape. While this variant of embodiment illustrated in FIG. 4 allows the down pipe 23 to be in the form of a cylindrical tubular pipe, the seat 2 of parallelepiped shape does not allow the positioning of a user's feet either side of the seat 2. The forming of the front face 11 of the seat in a rounded shape (FIGS. 1 to 3) enables a user to position feet either side of the seat 2. In this case the width of the seat 2 is reduced leading to a reduction in the width of the conveyor belt 15. According to this variant of embodiment at least part of the projection of the evacuation opening 3 extends outside the conveyor belt 15 as can be clearly seen in FIG. 3. To ensure the conveying of solid waste 5 and liquid effluent 4 as far as the conveyor belt 15, the down pipe 23, as illustrated in FIG. 5, comprises a lower end $23_1$ delimiting an opening whose projection extends inside the conveyor belt 15. The lower end $23_1$ is connected via a flared connecting wall $23_2$ delimiting a through cross-section $23_3$ at least equal to that of the evacuation opening 3. The lower end $23_1$ in its rear part comprises an opening $23_4$ for the passing of solid waste 5. The evacuation opening 3 is skirted by the flared connecting wall $23_2$ extended downwardly via the lower end $23_1$, thereby ensuring the conveying of solid waste 5 and liquid effluent 4 as far as the receiving surface 14.

Figure 3A:
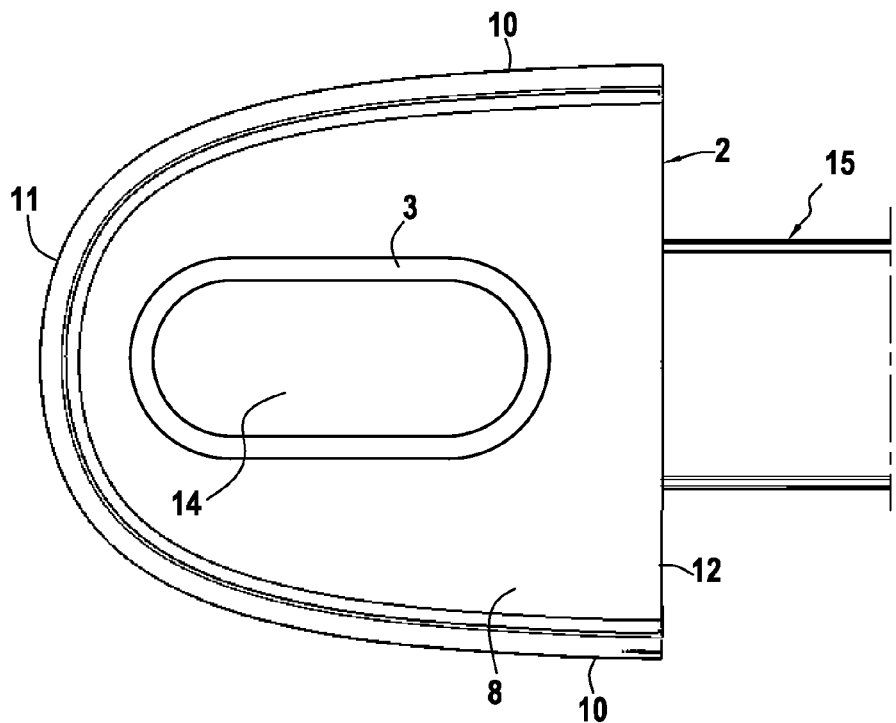
FIG. 3A is an overhead view of a variant of embodiment of the toilet seat conforming to the invention.

In the example illustrated in FIGS. 1 to 3, the evacuation opening 3 has an elliptical shape. FIG. 3A illustrates another example of embodiment in which the gravity evacuation opening 3 has an oblong through cross-section so that its projection lies inside a conveyor belt 15 of reduced width not requiring a flared down pipe 23 as described in FIG. 5.

Figure 6:
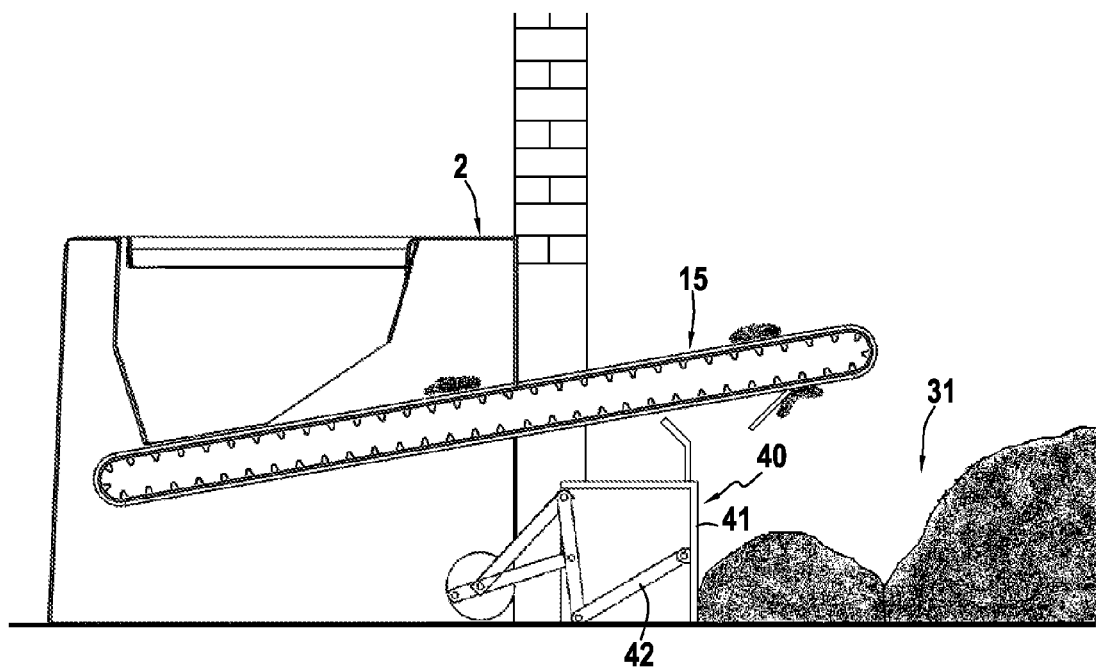
FIGS. 6 and 7 are elevation views showing an example of embodiment of a device for transferring solid waste.
Figure 7:
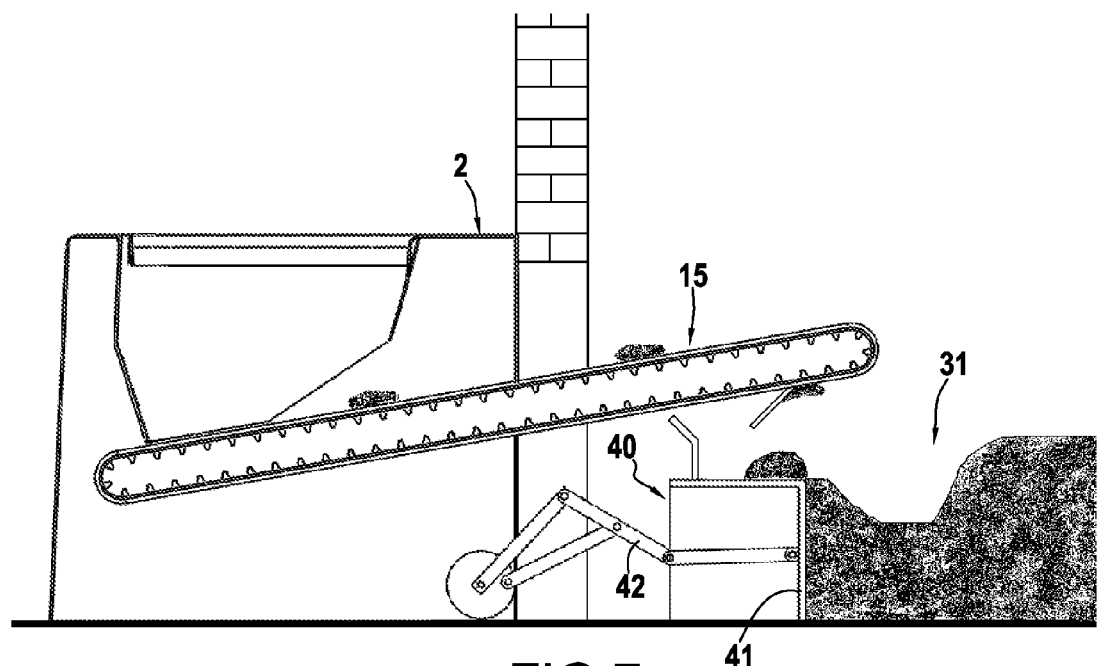

According to one variant of embodiment the toilet installation 1, as illustrated in FIGS. 6 and 7, comprises a device 40 for transferring the solid waste 5 which has accumulated in the storage area 31 directly underneath the top part of the conveyor belt 15. According to one advantageous characteristic of embodiment, the functioning of the transfer device 40 is synchronized with the travel of the conveyor belt 15. Said transfer system 40 can be of any type known per se. For example, said transfer system 40 is of mechanical type and comprises a pusher blade 41 moved by a system 42 of articulated link type connected via a mechanical connection to the conveyor belt 15.

The to and fro movement of the device 40 ensures the storing of solid waste outside the fall area 31 of the solid waste 5.

Figure 8:
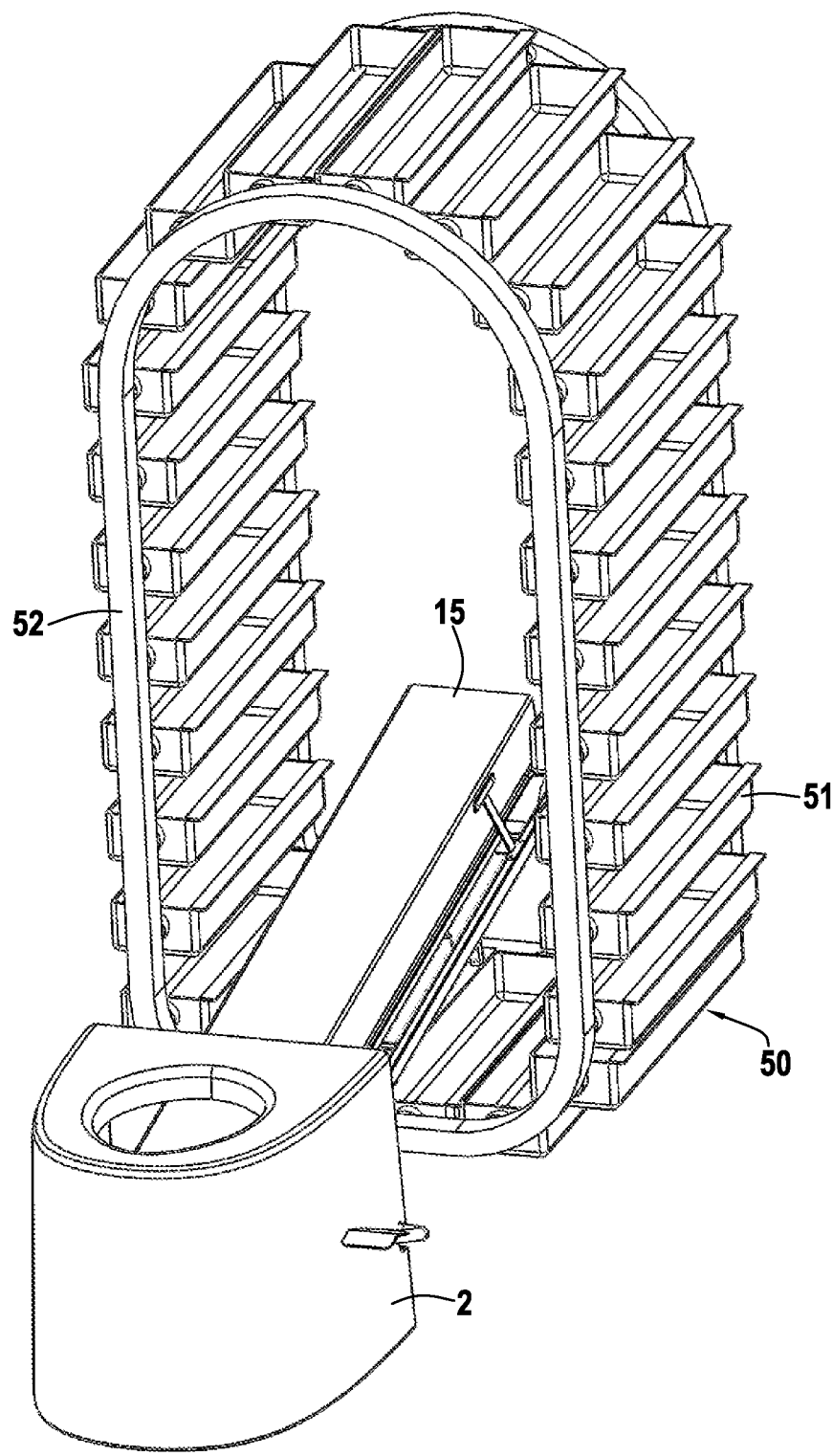
FIGS. 8 and 9 are perspective front side and rear side views respectively of an example of embodiment of a device for collecting solid waste.
Figure 9:
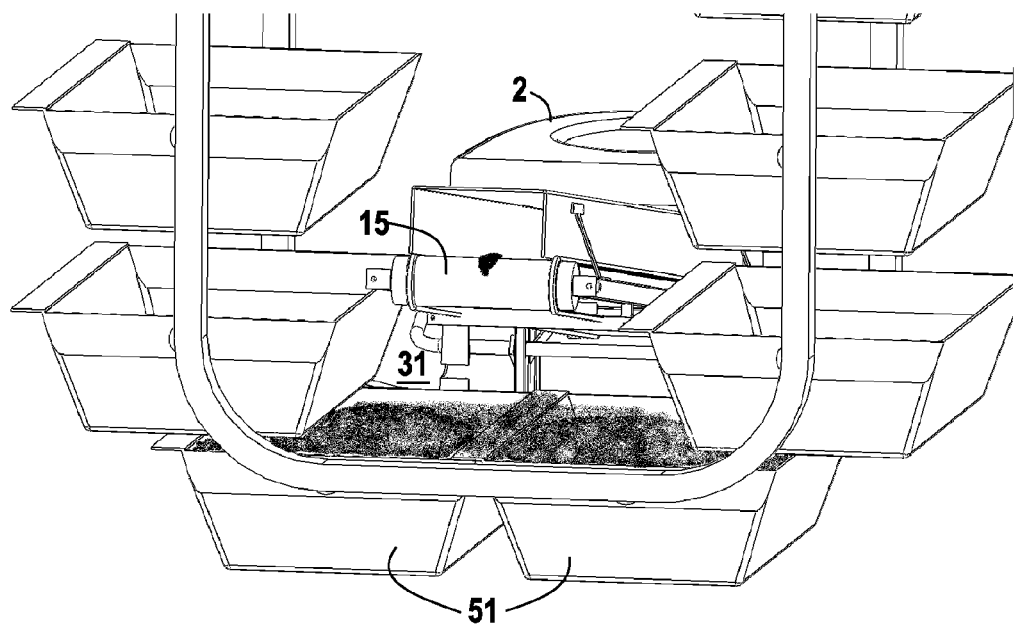

FIGS. 8 and 9 illustrates another variant of embodiment in which the toilet installation 1 comprises a collecting device 50 to collect the solid waste 5 brought into the storage area 31. In the illustrated example, the collection device 50 comprises a bucket line 51 mounted so that it is moved on a carrier frame 52 forming an "O"-shaped closed loop vertical guide path. Over the course of their pathway the buckets 51 are brought in succession into the storage area 31. As can be seen in FIG. 9, when the buckets 51 come to lie directly underneath the top part of the conveyor belt 15 two adjacent buckets 51 are contiguous to form a continuous receiving surface for the solid waste 5. After the passing of the buckets 51 in the storage area 30, the buckets 51 are moved vertically upwards and then downwards to again pass through the storage area 30. Along their pathway, each bucket 51 is emptied at a collection station either manually or automatically. Provision can therefore be made so that each bucket 51 is swing-mounted relative to the frame 52 so that they can be emptied by a moving cam.

Evidently, the movement of the buckets 51 is synchronized with the travel of the conveyor belt 15. The movement of the buckets 51 can be ensured by any known means such as a guided chain on the frame for example and on which the buckets 51 are secured. This chain is moved via a drive-line connected to the conveyor belt 15.

Figure 10:
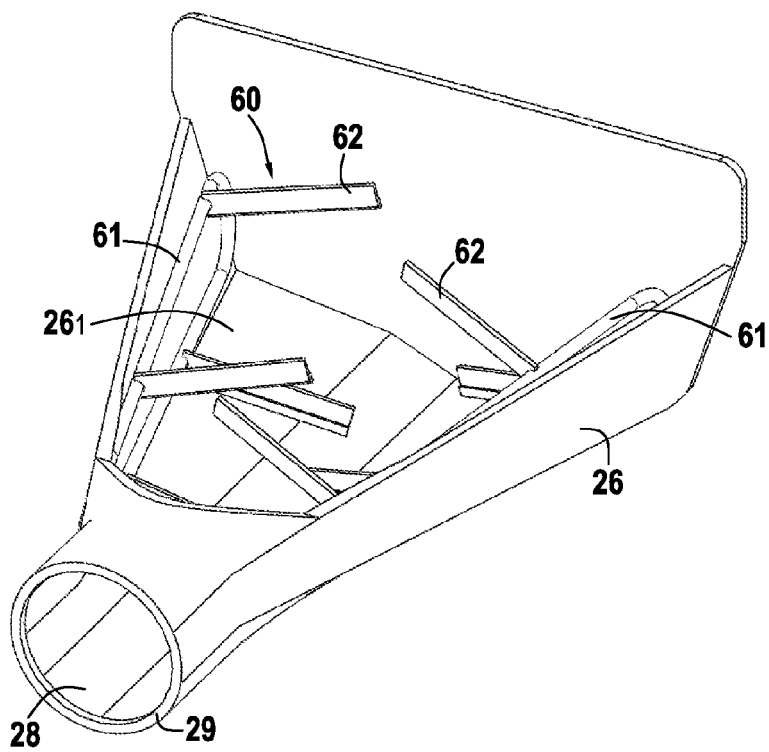
FIG. 10 is a perspective view of a variant of embodiment in which the tank for collecting liquid effluent is provided with a scraper system.

According to one preferred variant of embodiment, the tank 26 receiving the liquid effluent comprises a scraper system 60 to scrape the run-off surface $26_1$ or a system for spraying a cleaning liquid onto the run-off surface (FIG. 10). Regular cleaning of the run-off surface $26_1$ keeps it clean by evacuating any solid deposits which may occur. These solid deposits correspond in particular to solid waste 5 accidentally brought into the tank 26 and to struvite which is a pasty precipitate formed from urine retention points formed by solid waste. This cleaning prevents the formation of this pasty precipitate which over the long term may deteriorate and even prevent the flow of liquids, and may in particular block the liquid evacuation opening 28.

In the example of embodiment illustrated in FIG. 10, the scraper system 60 comprises two drive lines 61 equipped with scrapers 62 which come into contact with and clean the run-off surface $26_1$. These drive lines 61 are driven in movement synchronized with the travel of the conveyor belt 15, by means of a transmission link between the drive lines 61 and the conveyor belt 15.

The invention is not limited to the examples described and illustrated since various modifications can be made thereto without departing from the scope of the invention

The invention claimed is:

1. A toilet installation comprising:
    a toilet seat (2) in the form of a hollow body which, opposite a lower bearing surface (9) on the ground, has an upper surface (8) in which there is arranged a gravity evacuation opening (3) for liquid effluent (4) and solid waste (5);
    a conveyor belt (15) mounted at an angle delimiting, between a bottom part and a top part, a receiving surface (14) for liquid effluent and solid waste, to ensure the separating under gravity of liquid effluent and solid waste;
    a device (25) for collecting the liquid effluent (4) derived from the conveyor belt (15),
    a transfer system (30) ensuring the forward travel of the conveyor belt (15) and hence the conveying of the solid waste from a receiving area located directly below the evacuation opening towards a storage area (31), characterized in that:

part of the conveyor belt (15), starting from its bottom part, is mounted inside the toilet seat (2) so that directly underneath the evacuation opening (3) the distance between the conveyor belt (15) and said opening (3) is between 15 and 35 cm, the conveyor belt projecting from the rear face of the seat through a passageway (18) made in said rear face of the seat;

the gravity evacuation opening (3) is skirted by a down pipe (23) extending as far as the receiving surface (14), being positioned so that its free end (231) is not parallel to the receiving surface (14), the anterior part of the free end (231) of the down pipe being mounted to lie flush with the receiving surface (14) so as to act as stop abutment for solid waste (5), the posterior part of the free end (231) of the down pipe (23) lying away from the receiving surface (14) to allow the passing of solid waste (5), the anterior and posterior parts of the free end (231) taking into account the front and rear faces (12) of the seat (2), the collection device (25) collecting liquid effluent (4) comprises a receiving tank (26) mounted inside the toilet seat (2) directly underneath the bottom part of the conveyor belt (15).

2. The toilet installation according to claim 1, characterized in that the gravity evacuation opening (3) is arranged in the upper surface (8) of the seat (2) whose front face (11) is of rounded shape.

3. The toilet installation according to claim 2, characterized in that the gravity evacuation opening (3) has a through cross-section of which at least part of the projection extends outside the conveyor belt (15) and in that the down pipe (23) has a lower end delimiting an opening whose projection extends inside the conveyor belt (15), the lower end (231) of the collection pipe being connected via a flared connecting wall (232) to the upper end (233) of the collecting pipe skirting the evacuation opening (3).

4. The toilet installation according to claim 1, characterized in that the toilet seat (2) is in the form of a chest of substantially parallelepiped shape.

5. The toilet installation according to claim 1, characterized in that the gravity evacuation opening (3) has an oblong through cross-section so that its projection lies inside the conveyor belt (15).

6. The toilet installation according to claim 1, characterized in that the down pipe (23) has an inner surface of dark colour and speckled appearance.

7. The toilet installation according to claim 1, characterized in that the receiving tank (26) for liquid effluent (4) comprises a trap part (27).

8. The toilet installation according to claim 1, characterized in that the receiving tank (26) has a run-off surface (261) as far as an evacuation opening (28), the receiving tank (26) being equipped with a scraper system (60) to scrape the run-off surface or to spray a cleaning liquid onto the run-off surface to remove solid deposits which may occur on said run-off surface.

9. The toilet installation according to claim 1, characterized in that in the storage area (31) it comprises a composting medium formed in particular of solid waste (5) brought by the conveyor belt (15) and of earthworms of a variety adapted to the conversion of waste into compost, and optionally a humidifying system intend to maintain the composting medium moist other than through the addition of urine.

10. The toilet installation according to claim 1 characterized in that it comprises a transfer device (40) transferring the solid waste which has accumulated in the storage area (31) directly below the top part of the conveyor belt.

11. The toilet installation according to claim 10, characterized in that the functioning of the transfer device (40) transferring waste is synchronized with the travel of the conveyor belt (15).

12. The toilet installation according to claim 1, characterized in that it comprises a recovery device (50) to collect solid waste brought into the storage area, comprising a bucket line (51) moving vertically, the buckets as they move being temporarily stationed in the storage area (31), this movement of the bucket line being synchronized with the travel of the conveyor belt (15).

\* \* \* \* \*